United States Patent [19]

Okumura

[11] Patent Number: 5,444,687
[45] Date of Patent: Aug. 22, 1995

[54] METHOD AND DEVICE FOR ACCESSING AN OPTICAL DISC

[75] Inventor: Takatoshi Okumura, Hamamatsu, Japan

[73] Assignee: Yamaha Corporation, Japan

[21] Appl. No.: 36,437

[22] Filed: Mar. 24, 1993

[30] Foreign Application Priority Data

Mar. 26, 1992 [JP] Japan .................................. 4-100679
Feb. 10, 1993 [JP] Japan .................................. 5-046006

[51] Int. Cl.$^6$ .............................................. G11B 7/00
[52] U.S. Cl. .......................................... 369/50; 369/48; 369/58; 369/60
[58] Field of Search ....................... 369/60, 59, 58, 54, 369/50, 49, 48, 47, 124

[56] References Cited

U.S. PATENT DOCUMENTS

| | | | |
|---|---|---|---|
| 5,182,741 | 1/1993 | Maeda et al. | 369/50 |
| 5,210,733 | 5/1993 | Yamauchi et al. | 369/48 |
| 5,212,678 | 5/1993 | Roth et al. | 369/60 |
| 5,243,587 | 9/1993 | Itoh et al. | 369/50 X |
| 5,257,248 | 10/1993 | Ogasawara | 369/59 X |

Primary Examiner—Georgia Y. Epps
Assistant Examiner—Muhammad N. Edun
Attorney, Agent, or Firm—Graham & James

[57] ABSTRACT

In a method and a device for accessing an optical disc such as a Compact Disc, a CD-ROM, a CD-I and a MD, an optical disc in which data is recorded or to be recorded at a constant linear velocity is rotated at a substantially constant number of revolution per unit time and this optical disc is accessed on the basis of a clock signal which changes its frequency in accordance with an access position (i.e., a read position or write position). Since random accessing is made in a state in which the optical disc is rotated at a substantially constant number of revolution per unit time, it is not necessary to wait in accessing until a stable revolution number is attained but the waiting time is determined only by time required for moving of the read head. This enables the waiting time to be reduced and thereby realizes accessing to the optical disc at a higher speed.

17 Claims, 7 Drawing Sheets

5,444,687

METHOD AND DEVICE FOR ACCESSING AN OPTICAL DISC

BACKGROUND OF THE INVENTION

This invention relates to a method and a device for random-accessing optical discs such as a Compact Disc, a CD-ROM and a CD-I in which data is recorded at a constant linear velocity and optical discs such as a MD (Mini Disc) in which data is to be recorded at a constant linear velocity for reading or writing of data and, more particularly, to a method and a device for accessing optical discs suitable for use in a case where random accessing to optical discs is frequently made.

For recording data in a Compact Disc, the CLV (constant linear velocity) system is generally employed for improving data memory capacity. During reproduction of data, therefore, it is necessary to change the rotation speed of the Compact Disc in accordance with an access position of a read head or an optical pick-up head on the Compact Disc. Such control is necessary also in a CD-ROM which utilizes a Compact Disc as a read-only memory. For this reason, in performing a random accessing a CD-ROM, a rotation control is frequently made for changing the rotation speed of the Compact Disc in accordance with a read position of the read head.

In a case where random accessing to a CD-ROM is made at a high speed according to the above described conventional method and device, the read head reciprocates frequently and at a high speed between the inner portion and the outer portion of a Compact Disc and, therefore, the number of revolution per unit time of the Compact Disc must be changed frequently and waiting time must be provided until the Compact Disc has attained the required number of revolution per unit time. This necessitates much time for waiting until attainment of the required number of revolution per unit time thereby hampering a high speed accessing to the CD-ROM.

This problem is particularly serious in a case where a motor of a small torque is used for rotating the disc because more time is spent for waiting until attainment of a stable revolution number than for movement of a read head with resulting deterioration in the accessing efficiency.

It is, therefore, an object of the invention provide a method and a device for accessing an optical disc capable of remarkably shortening waiting time during accessing and thereby realizing a high speed accessing to the optical disc.

SUMMARY OF THE INVENTION

For achieving the above described object of the invention, there is provided a device for accessing an optical disc in and from which data is recorded or reproduced at least at a constant linear velocity comprising means for rotating the optical disc at a constant rotation velocity a head for accessing the optical disc for recording or reading out the data, head moving means for moving the head in the radial direction of the optical disc wherein, when the optical disc is driven by drive means, the head accesses the optical disc at a constant rotation velocity, and data processing means for changing a clock in accordance with the position of the head in the radial direction of the optical disc and processing data which is recorded in or reproduced from the optical disc in response to this clock, wherein the data which is accessed relatively to the optical disc by the head at a constant rotation velocity is recorded or reproduced substantially at a constant linear velocity.

There is also provided a method for accessing an optical disc in and from which data is recorded or reproduced at least at a constant linear velocity comprising the steps of rotating the optical disc at a constant rotation velocity, moving a head for accessing the optical disc for recording or reading out the data in the radial direction of the optical disc in such a manner that, when the optical disc is driven by drive means, the head accesses the optical disc at a constant rotation velocity, changing a clock in accordance with the position of the head in the radial direction of the optical disc and processing data which is recorded in or reproduced from the optical disc in response to the clock, wherein the data which is accessed relatively to the optical disc by the head at a constant rotation velocity is recorded or reproduced substantially at a constant linear velocity.

According to the device and method, an optical disc in which data is recorded or to be recorded at a constant linear velocity is rotated at a substantially constant number of revolution per unit time and this optical disc is accessed on the basis of a clock signal which changes in accordance with an access position. Since random accessing is made in a state in which the optical disc is rotated at a substantially constant number of revolution per unit time, it is not necessary to wait in accessing until a stable revolution number is attained as in the prior art method but the waiting time is determined only by time required for moving of the read head. This enables a much higher accessing to the optical disc than in the prior art method. In one aspect of the invention, there is provided a device for reproducing an optical disc, the optical disc having data recorded therein at a constant linear velocity at a substantially constant number of revolution per unit time comprising, drive means for rotating the optical disc, data reading means for reading the data recorded in the optical disc to produce a read signal, clock reproduction means for reproducing a clock signal from the read signal provided by said reading means, demodulation means for demodulating the read signal accordance with the clock signal reproduced by the clock means, a memory for successively storing the demodulated signal obtained by the demodulating means, and reproduction processing means for reading out the demodulated signal stored the memory at a predetermined time and subjecting it to a reproduction processing.

There is also provided a method for reproducing an optical disc, the optical disc having data recorded therein at a constant linear velocity at a substantially constant number of revolution per unit time, the method comprising the steps of rotating the optical disc, reading the data recorded in the optical disc to produce a read signal, reproducing a clock signal from the read signal, demodulating the read signal in accordance with the reproduced clock signal, storing the demodulated signal successively in a memory, and reading out the demodulated signal stored in the memory at a predetermined time and subjecting it to a reproduction processing.

According to the device and method accessing the optical disc in association with reproduction of the optical disc, data is read from the optical disc while the optical disc having data recorded therein is rotated at a substantially constant number of revolution per unit time. In this case, the rate of the read signal provided by the read head changes depending upon read position in the radial direction of the optical disc. Since the clock signal is reproduced from the read signal, the frequency of the read signal changes in accordance with the rate of the read signal. The read signal is demodulated in accordance with the obtained clock signal and successively stored in the memory. The demodulated signal stored in the memory is read out at a predetermined time and subjected to a predetermined reproduction processing.

In another aspect of the invention, there is provided a device for recording data in the optical disc in which data is to be recorded at a constant linear velocity at a substantially constant number of revolution per unit time, the device comprising data writing means for writing a record signal in the optical disc, memory means for storing data to be recorded, clock generation means for generating a clock signal which successively changes in its frequency in accordance with a position of the write head in the radial direction of the optical disc, and modulation for modulating the data read from the memory means as a record signal in accordance with the clock signal and providing it to the record head.

There is also provided a method for recording data in the optical disc in which data is to be recorded at a constant linear velocity at a substantially constant number of revolution per unit time, the method comprising the steps of rotating the optical disc, writing a record signal in the optical disc, storing data to be recorded in a memory, generating a clock signal which successively changes in its frequency in accordance with a position of the write head in the radial direction of the optical disc, and modulating the data read from the memory as a record signal in accordance with the clock signal and providing it to the record head.

According to the device and method for accessing the optical disc in association with recording in the optical disc, data is written in the optical disc while the optical disc in which the data is to be recorded is rotated at a substantially constant number of revolution per unit time. In this case, the rate of the record signal to be recorded in the optical disc changes in accordance with the record position in the radial direction of the optical disc. Since the data is recorded by using the clock signal which changes its frequency in accordance with the record position, the data is written in the optical disc at a constant linear velocity. Hence, the number of revolution of the optical disc can be made substantially constant in writing also, so that the recording speed can be increased.

Preferred embodiments of the invention will be described below with reference to the accompanying drawings.

BRIEF DESCRIPTION OF THE DRAWINGS

In the accompanying drawings.

DESCRIPTION OF PREFERRED EMBODIMENTS

Figure 1:
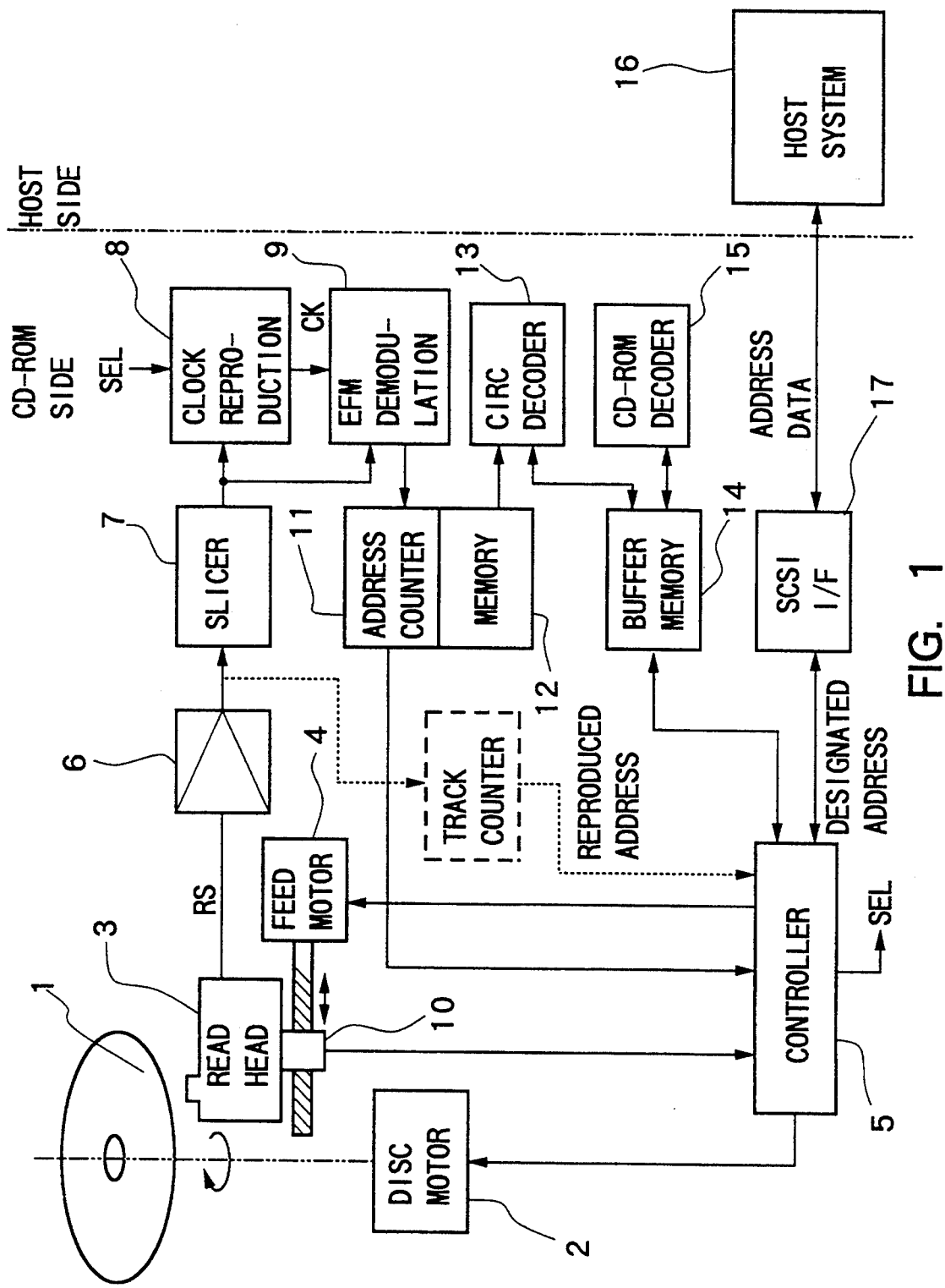
FIG. 1 is a block diagram showing an embodiment of the invention applied to a CD-ROM drive device.

FIG. 1 shows an embodiment of the invention applied to a CD-ROM drive device.

Figure 2:
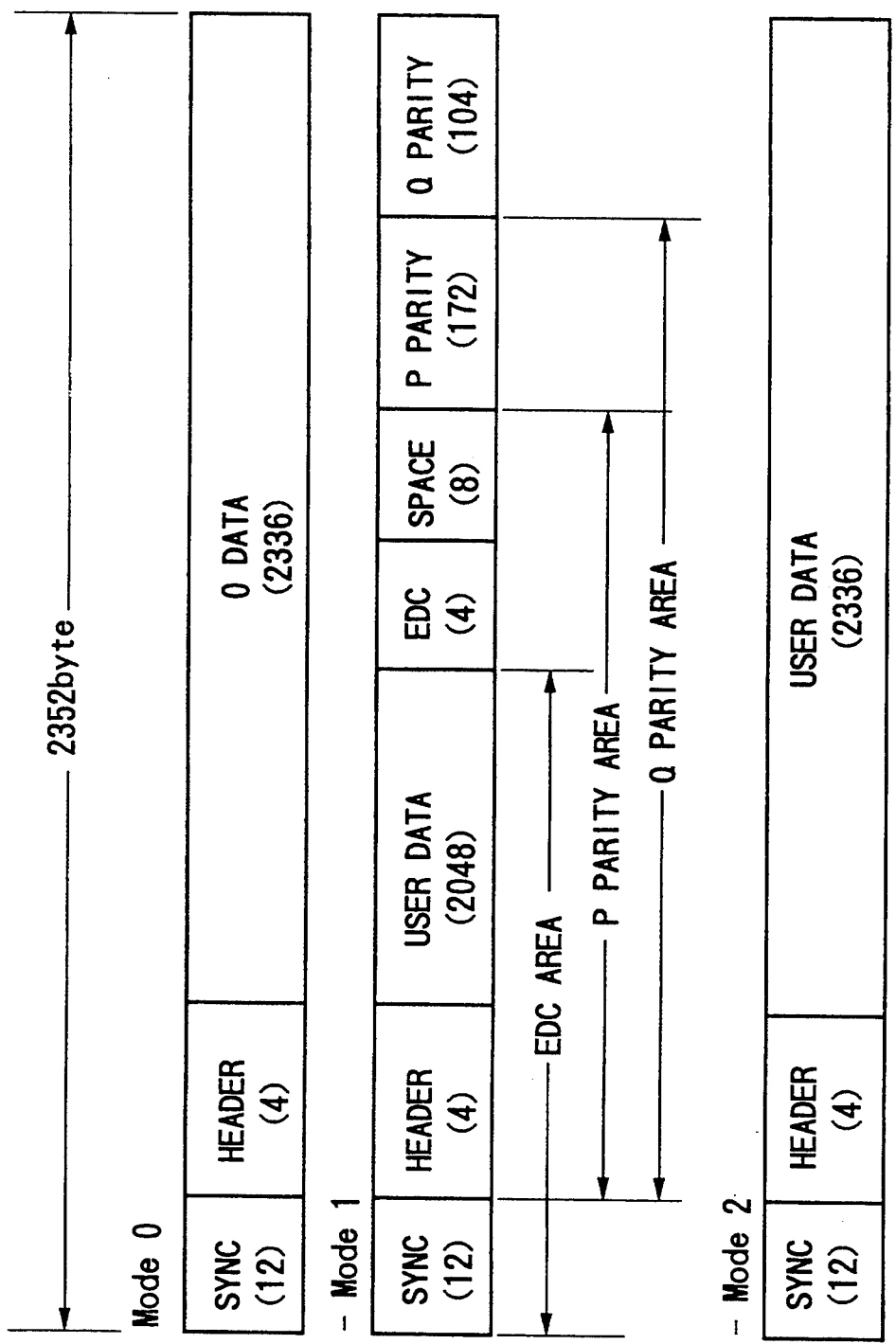
FIG. 2 is a schematic diagram showing a data format of a CD-ROM.

Predetermined data is recorded on a track or groove of a CD-ROM 1 by the CLV system and this CD-ROM 1 is driven and rotated at a substantially constant number of revolution per unit time, i.e., at a constant angular velocity. Data format of this CD-ROM 1 is shown in detail in FIG. 2.

In this CD-ROM 1, one block is made of 2352 bytes In each block, initial 12 bytes are allotted to synchronizing data and next 4 bytes are allotted to header information. The header information is made of address information consisting of MINUTE (1 byte), SECOND (1 byte) and BLOCK (1 byte) and mode information (1 byte). The remaining 2336 bytes have different contents depending upon the mode. In Mode 0, zero data is allotted to dummy. In Mode 1, 2048 bytes are allotted to user data and other bytes are allotted to error detection code (EDC) and P and Q parities for error correction. In Mode 2, 2336 bytes are all allotted to user data.

These data are recorded with subcoding information in the CD-ROM 1 in synchronism with a write clock of 4.3218 MHz and at a constant linear velocity of 1.2 m.sec. to 1.4 m/sec. A disc motor 2 rotates this CD-ROM 1 at a speed of, e.g., 1200 rpm. In this case, the linear velocity at the innermost circumference of the disc ($\phi$46 mm) is substantially 2.9 m/sec. and the linear velocity at the outermost circumference of the disc ($\phi$116 ram) is substantially 7.28 m/sec. and, accordingly, the read speed is about double the constant linear velocity at the innermost circumference of the disc and is about five times the constant linear velocity at the outermost circumference of the disc. In other words, the frequency of the read clock is about double the frequency of the write clock at the innermost circumference of the disc and about five times the frequency of the write clock at the outermost circumference of the disc The revolution number of the disc motor 2 is not limited to 1200 rpm but it may be set at a suitable revolution number such as 600 rpm and 2400 rpm depending upon the frequency characteristic and access speed.

A read head 3 including unillustrated laser diode, optical system, focus actuator and four-split photodiode etc. irradiates laser beam on pits of the CD-ROM 1, receives its reflected beam and thereupon outputs a read signal RS to a head amplifier. The read signal RS is supplied also to the unillustrated focus actuator of the read head 3 through the unillustrated focus servo system whereby a focus control of the read head 3 with respect to the CD-ROM 1 is realized.

To the read head 3 is connected a feed motor 4 for driving the CD-ROM 1 in the radial direction. The feed motor 4 moves the read head 3 to a position corresponding to a designated address in accordance with a control signal supplied by a controller 5. Although not illustrated, the read head 3 produces a tracking error signal and this tracking error signal is fed back to the feed motor 4 through an unit illustrated tracking servo system thereby to serve for the tracking control of the read head 3. As the disc motor 2, read head 3, feed motor 4 and servo system described above, those used for conventional CD-ROM or CD playback devices may be used.

The read signal RS provided by the read head 3 is applied to the head amplifier 6. The head amplifier 6 is made of a broad range amplifier of, e.g., 4 MHz to 30 MHz so that it can cover the speed difference of the read signal between the innermost and outermost circumferences of the CD-ROM 1. The read signal provided by the head amplifier is waveform-shaped by a slicer 7 and thereafter is supplied to a clock reproduction circuit 8 and an EFM demodulation circuit 9.

Figure 3:
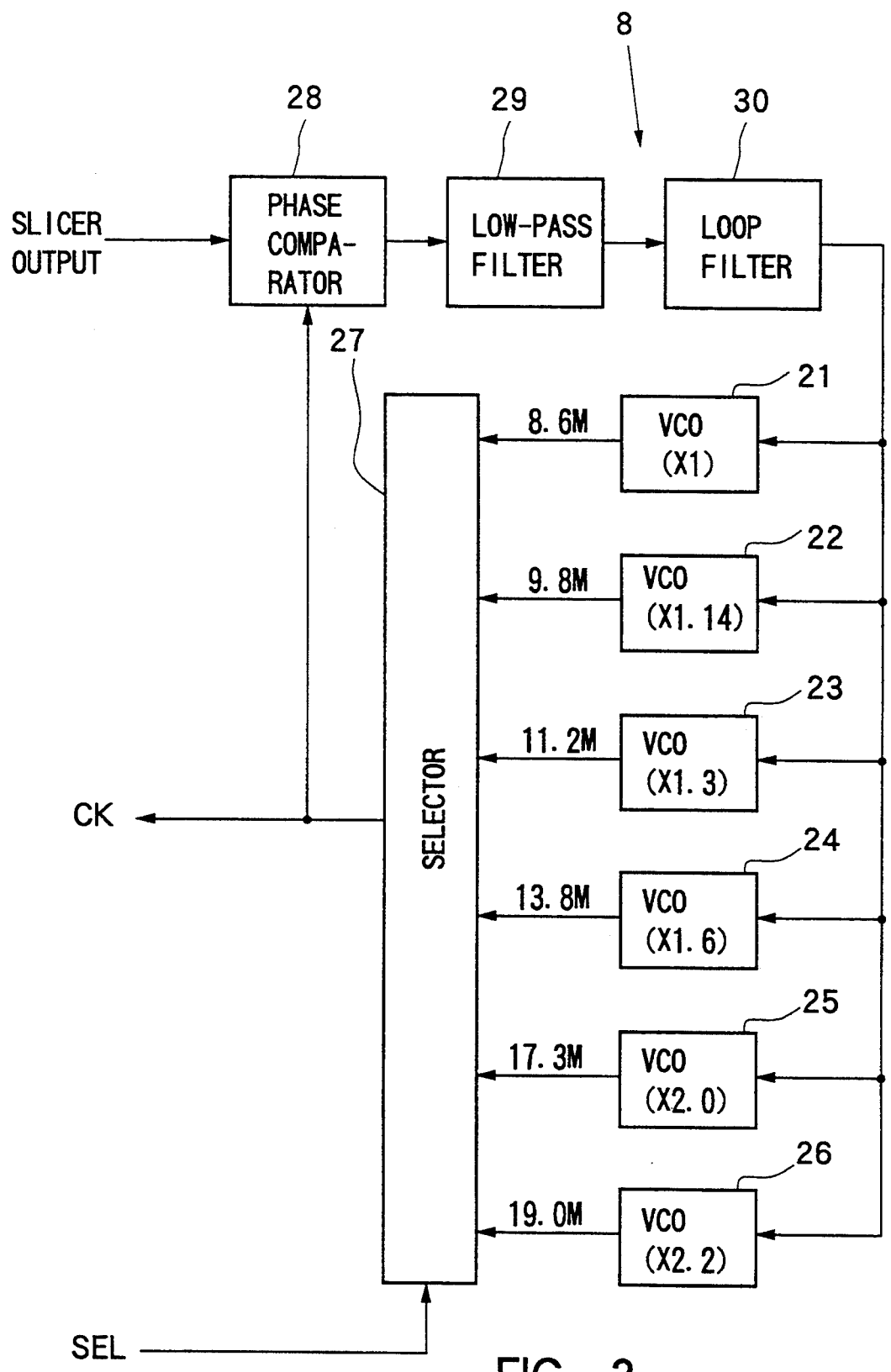
FIG. 3 is a block diagram showing a clock reproduction circuit in the CD-ROM drive device of FIG. 1.

The clock reproduction circuit 8 is made of a PLL circuit including a VCO (voltage-controlled oscillator) and produces a clock signal CK in synchronism with the read signal RS. The clock reproduction circuit 8 may be constructed of a circuit including a VCO which has a sufficiently broad capture range so as to be able to cope with the read signal RS of 8 MHz to 20 MHz provided by the read head 3 or a circuit which can progressively change the center frequency of the VCO in accordance with the position of the read head 3. In the latter case, the clock reproduction circuit may be constructed, for example, of a circuit shown in FIG. 3. In FIG. 3, the clock reproduction circuit 8 switches, by means of a selector 27, outputs of six VCOs 21 to 26 whose center frequencies are set at one time, 1.14 times, 1.3 times, 1.6 times, 2.0 times and 2.2 times the clock frequency at the innermost circumference of the disc and applies a selected output of the VCOs 21 to 26 to a phase comparator 28 and also provides it as a reproduced clock CK. These VCOs 21 to 26 and the selector 27 constitute, together with the phase comparator 28, a low-pass filter 29 and a loop filter 30, a PLL (phase-locked loop). The low-pass filter 29 and the loop filter 30 produce DC signals in response to the output of the phase comparator 28. By locking this PLL, a clock signal CL having a frequency which corresponds to the output from the slicer 7 is provided from one of the VCO 21 to 25 selected by the selector 27.

The read head 13 in FIG. 1 includes also a linear encoder 10 detecting the amount of displacement of the read head 3 in the radial direction of the disc. In response to an output of this linear encoder 10 and the center frequency of the VCO computed by the controller 5, the controller 5 produces a selection signal SEL and this selection signal SEL is provided as a selection input of the selector 27 so that an optimum center frequency of the VCOs 21 to 26 will be selected.

The clock signal CK reproduced by the clock reproduction circuit 8 is supplied to the EFM demodulation circuit 9. The EFM demodulation circuit 9 demodulates, responsive to the reproduced clock signal CK, the 1-byte 14-bit read signal based on the CD format to 8-bit demodulated data. The demodulated data is successively stored in a memory 12 through an address counter 11.

Upon storing of the demodulated data of a certain amount, more specifically data of 108 blocks necessary for deinterleaving, in the memory 12, this demodulated data is supplied to a CIRC decoder 13. At this time, an EFM demodulation processing is performed in parallel.

The amount of stored data in the memory 12 is watched by the address counter 11. When a processing in the CIRC decoder 13 in the posterior stage has not been completed before the memory 12 becomes full of data, the address counter 11 notifies the controller 5 about this fact. Upon receipt of this notice, the controller 5 kicks back the read beam position of the read head 3 and causes the read head 3 to wait at the same position. Upon creation of vacancy in the memory 12, data which is next to the data supplied to the CIRC decoder 13 is read out with reference to address information in the CD-ROM 1. When the memory 12 has become full, the rotation speed (angular velocity) of the disc motor 2 may be made lower.

The CIRC decoder 13 performs a CIRC correction processing to the demodulated data supplied from the memory 12. The data after the CIRC correction is successively stored in a buffer memory 14. The data stored in the buffer memory 14 is supplied to a CD-ROM decoder 15. The CD-ROM decoder 15 subjects the data to various processings including detection of the synchronizing signal, disc ramble processing, separation of the header from data, mode detection and error correction and thereby reproduces address and data. The reproduced address and data are stored in the buffer memory 14.

A designated address provided by host system 16, e.g., a computer system, is supplied to the controller 5 through a SCSI interface 17. When the reproduced address stored in the buffer memory 14 coincides with the designated address, the controller 5 supplies the reproduced data stored in the buffer memory 14 to the host system 16 through the SCSI interface 17.

Description will now be made about use of operation clocks in the above described structure. A portion in which the reproduced clock CK must be used is the EFM demodulation circuit 9 through a portion in which the demodulated data is stored in the memory 12. Processings of the CIRC decoder 13 and subsequent processings need not necessarily be executed by means of the reproduced clock CK but may be executed by means of a different clock of a constant frequency. In that case, the different clock of the constant rate should preferably have a rate which is sufficiently high for coping with reading of the high rate data at the outermost circumference of the Compact Disc but, in the case of a CD-ROM, for example, it is possible to kick back the read beam position and cause the read head to wait as desired and, therefor, a clock of a low rate may also be used. The SCSI interface 17 should preferably be operated at a clock which is of a constant rate for the SCSI interface 17 exchanges data with the host system 16 such as the computer. Thus, in the structure of FIG. 1, the processings in the CIRC decoder 13, CD-ROM decoder 15 and data storing in the buffer memory 14 may be executed either by the reproduced clock CK or by a predetermined constant rate clock.

The operation of the above described CD-ROM drive device will now be described.

Figure 4:
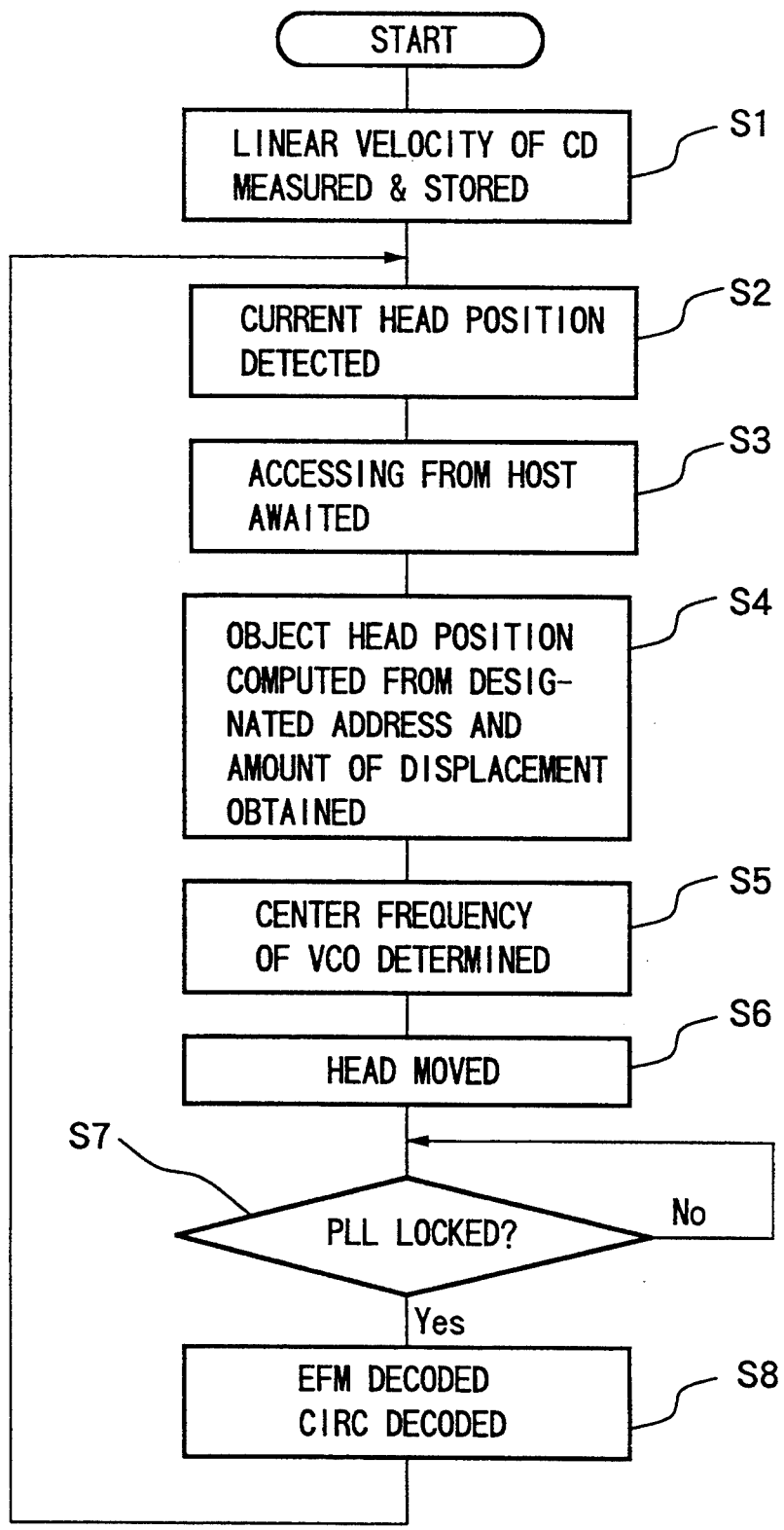
FIG. 4 is a flow chart showing the operation of the CD-ROM drive device.

FIG. 4 is a flow chart showing the operation of this device.

Upon starting of operation of the device, the linear velocity of the CD-ROM 1 is measured first (S1). In the CD-ROM 1, data is recorded at a constant linear velocity of 1.2 m/sec. to 1.4 m/sec. but the recording speed differs depending upon the disc, so that it is necessary to know the recording speed of data in the CD-ROM 1 first. For this purpose, for example, the feed motor 4 is driven under the control of the controller 5 to move the read head 3 to a position of φ50 mm of the CD-ROM 1 to detect a data block of, e.g., 00 minute, 02 second, 00 block. Then, the read head 3 is moved from this position to a position of about φ76 mm at which a data block of 20 minute, 02 second, 00 block should be recorded at the linear velocity of 1.3 m/sec. and the center frequency of the VCO in the clock reproduction circuit 8 is switched to (×1.6) to read the address information. If the address information is about 19 minute, the linear velocity is judged to be 1.4 m/sec at the linear velocity of recorded data. If the address information is about 20 minute, the linear velocity is judged to be 1.3 m/sec as the linear velocity. If the address information is about 22 minute, the linear velocity is judged to be 1.2 m/sec as the linear velocity. The detected linear velocity is stored in the controller 5.

Then, after detecting the current position of the read head 3 (S2), accessing from the host system 15 is awaited (S3). When accessing has been made by the host system 16 and a designated address has been given, the controller 5 calculates, responsive to the measured write speed information, an object address position and an amount of displacement from the current head position (S4). When, for example, the write speed is known to be 1.4 m/sec. and the block corresponding to the designated address is a block of 32 minute, 43 second, 37 block, a position of φ90 mm is calculated as the position to which the read head should be displaced.

Then, the controller 5 determines the center frequency of the VCO of the clock reproduction circuit 8 on the basis of the position to which the read head should be displaced (S5). If, for example, the position to which the read head 3 should be displaced is φ90 mm, the linear velocity becomes about double the linear velocity at the innermost circumference of φ46 mm, so that the VCO 25 having the center frequency of (×2.0) in FIG. 3 is selected by the selector 27.

Then the controller 5 moves the read head 3 to the position of φ90 mm (S6). Upon locking of the PLL of the clock reproduction circuit 8 (S7), the EFM demodulation by the EFM demodulation circuit 9 is started by using the reproduced clock CK and the demodulated data is stored in the memory 12. Upon storing of the demodulated data in the memory 12 by a predetermined amount, the CIRC decoding is started (S8). Upon coincidence of the reproduced address with the designated address, the reproduced data is supplied to the host system 16 through the SCSI interface 17.

As described in the foregoing, according to the CD-ROM drive device of this embodiment, the center frequency of the VCO constituting the clock reproduction circuit 8 is switched according to the position of the read head 3, so that the period of the reproduced clock CK can be changed over a broad range. By changing the period of the reproduced clock CK in this manner, data at any position on the CD-ROM 1 can be accurately read notwithstanding that the number of revolution per unit time of the CD-ROM 1 remains constant.

In the above described embodiment, the position of the read head 3 is detected by the output of the linear encoder 10. Alternatively, as shown by a dotted line in FIG. 1, for example, the position of the read head 3 may be detected by a track counter 18 which counts the track number on the basis of an output signal from the head amplifier 6.

In the above described embodiment, the invention is applied to the drive device of a CD-ROM which is accessed by random accessing. The invention is applicable also to a method of reproducing an optical disc recorded with music or video data which is basically accessed by sequential accessing. In this case, the capacity of a primary loading memory which stores data after reading should be set at a capacity which will not overflow at the maximum linear velocity, i.e., at the outermost circumference of the disc, and data stored in the memory should be read out at a constant rate.

In the above described embodiment, the invention is applied to a data reproduction device. The invention is applicable also to a data recording device. In a magneto-optical disc in which data can be written, for example, there is a case where accessing is made alternately to different positions in the radial direction of the disc such, for example, as a case where the disc has a format of a block construction or a sector construction. In such case, recording accessing of reduced time can be realized by changing a write clock in accordance with the radial position of the disc while maintaining the rotation speed of the disc at a constant speed.

Figure 5:
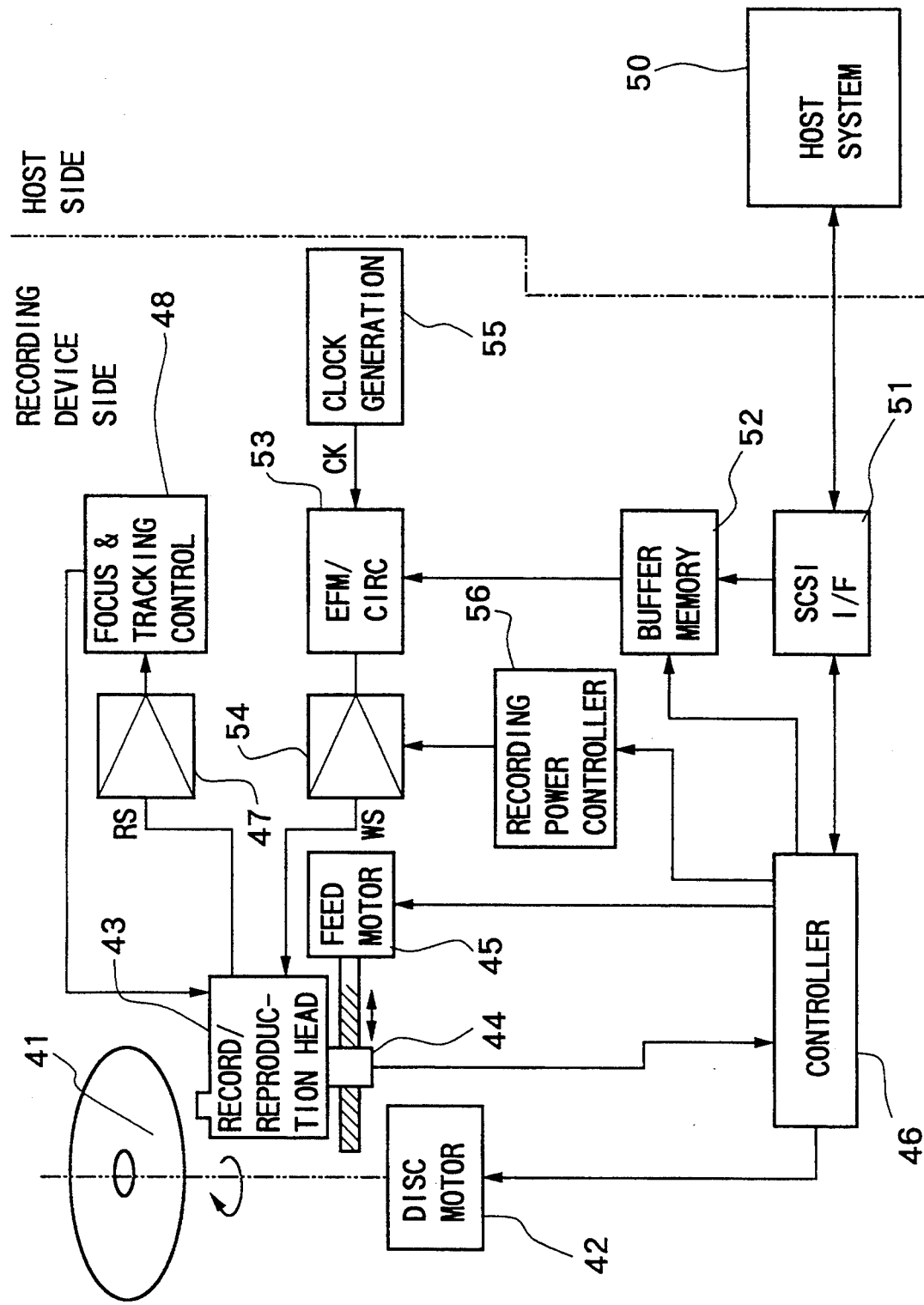
FIG. 5 is a block diagram showing another embodiment of the invention applied to a MD recording device.

FIG. 5 is a block diagram showing an embodiment of the invention applied to a MD.

An optical disc 41 is a rewritable magneto-optical (MO) disc in which data is writted by the CLV system and is rotated at a substantially constant number of revolution per unit time by a disc motor 42. Data is recorded on this optical disc 41 by a record/reproduction head 43 including unillustrated semiconductor laser, optical system, focus actuator and four-split detector etc. The record/reproduction head 43 includes a linear encoder 44 detecting a position of the head 43 in the radial direction of the disc and is connected to a feed motor 45 which drives the head 43 in the radial direction of the optical disc 41. This feed motor 45 moves the record/reproduction head 43 to a position corresponding to a designated address in accordance with a control signal supplied by a control let 46 in response to an output of the linear encoder 44. A focus error signal and a tracking error signal detected by the record/reproduction head 43 are applied to a focus and tracking control circuit 48 through a head amplifier 47. The focus and tracking control circuit 48 applies focus and tracking controls to the record/reproduction head 43 in response to these error signals.

Designated address and record data supplied from a host system 50 are stored in a buffer memory 52 for the record data through an SCSI interface 51. The record data stored in the buffer memory 52 is read out in accordance with an output control made by the controller 46 and is supplied to an EFM/CIRC encoder 53. The record data is CIRC-coded and then EFM modulated in this encoder 53. The modulated data is supplied to the record/reproduction head 43 through a power amplifier 54 of a variable gain type and thereby is written on the optical disc 41.

A write clock CK at this time is generated by a clock generation circuit 55. The controller 55 computes a current record position on the optical disc 41 on the basis of the output of the linear encoder 44 and calculates the record rate (linear velocity) in the track direction on the basis of the data of the current record position. The clock generation circuit 55 generates the clock signal CK of a period corresponding to this linear velocity. The record data which has been EFM-modulated in response to this clock signal CK is supplied to the record/reproduction head 43 through the power amplifier 54.

In this case, the recording power of the record/reproduction head 43 should be changed in accordance with the linear velocity. It is generally known that the laser power during recording is substantially proportional to the root of the linear velocity. In a case where the number of revolution of the disc is constant, a control may be made so that the clock frequency will be proportional to the position in the radial direction of the disc and the laser power will be proportional to the root of the position in the radial direction. A recording power controller 56 controls the power amplifier 54 so as to supply recording power corresponding to the linear velocity.

Assuming that recording is made alternately at a position of 16 mm in the radial direction of the optical disc 41 and a position of 20 mm in the radial direction of the optical disc 41 while the optical disc 41 is rotated at a constant speed of 16 revolution per second, the linear velocity at the former position becomes 1.608 m/sec. and the linear velocity at the latter position becomes 2.011 m/sec. Assuming that an optimum recording laser power at the inner position (r=16 mm) is 6 mW, an optimum recording laser power at the outer position becomes 6 [mW]*$\approx$((2.011/1.601)=6 [mW]*1.12=6.7 [mW].

Accordingly, when first data for 40 sectors, for example, is to be recorded at the former position, the recording power is set at 6 mW and the data is recorded with a write clock of 4.2318 MHz. Then, the record/reproduction head 43 is moved to the latter position and, when second data for 40 sectors, for example, is to be recorded, the recording power is raised to 6.7 mW and the data is recorded with a write clock of, e.g., 7.203 MHz. In this manner, by changing the write clock in proportion to r/r0 (r0 being the radius of the optical disc) and the laser power in proportion to $\approx$(r/r0), data of a constant linear velocity can be recorded regardless of the record position while the number of revolution per unit time of the optical disc 41 is maintained constant.

In the above described embodiment, the frequency of the write clock is determined on the basis of the position of the record/reproduction head 43 in the radial direction. Alternatively, the record position may be obtained on the basis of a wobble signal previously embedded in the guide groove of a track on the optical disc 41 or position information called "absolute time in groove" (ATiP) which is a modulated and recorded wobble signal and the write clock may be generated on the basis of this write clock. In the case of a CD-MO generally, a clock signal can be obtained from a wobble signal during recording. This wobble signal is recorded by the CLV system.

Figure 6:
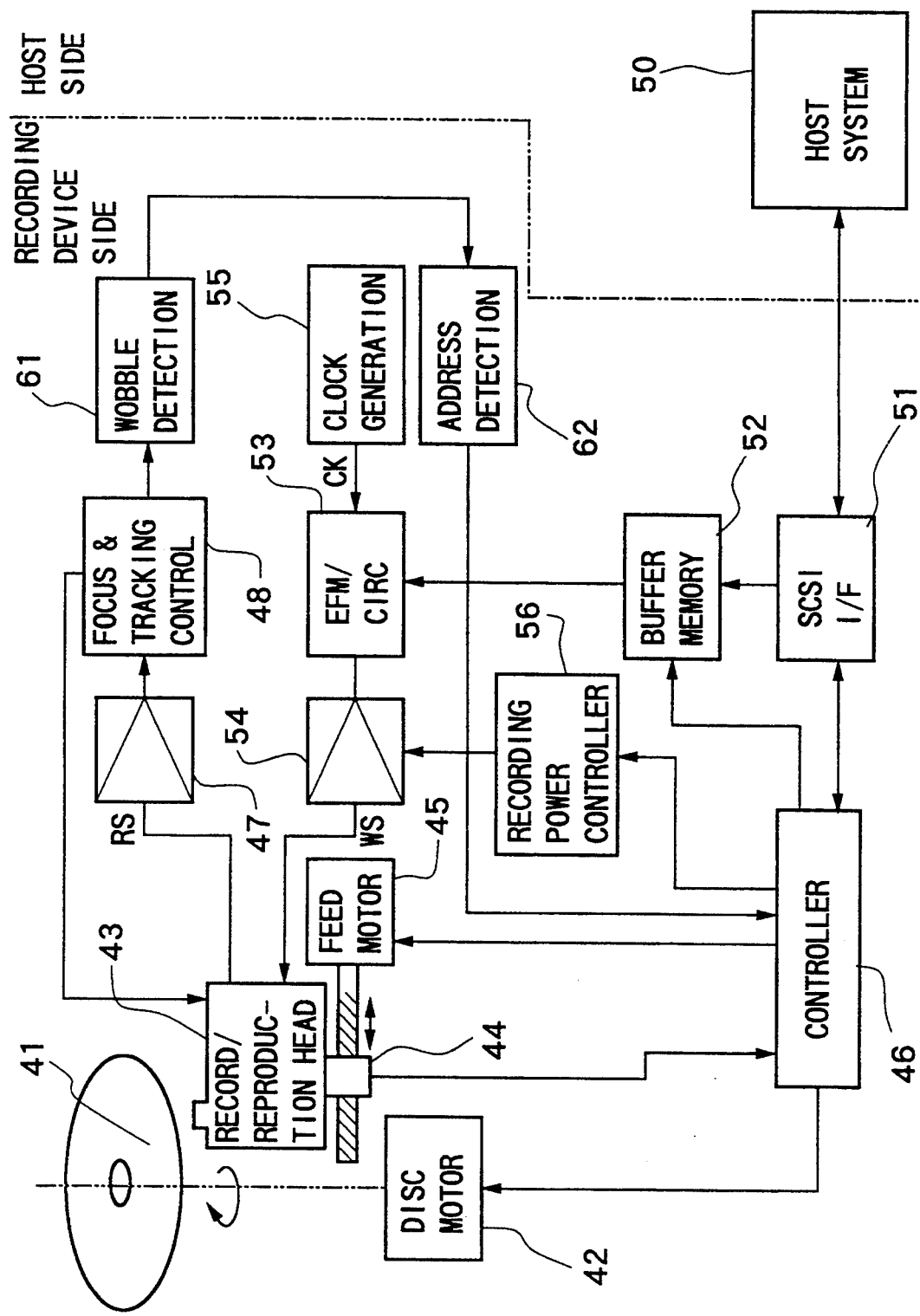
FIG. 6 is a block diagram showing another embodiment of the invention applied to a recording device using a wobble signal embedded in an optical disc.

FIG. 6 is a block diagram showing an embodiment of a recording device using a wobble signal embedded in the guide groove of a track.

A wobble signal is contained in a tracking error signal for tracking-controlling in the record/reproduction head 43. Assuming that the frequency of the wobble signal is set at 1/98 of the clock frequency of 4.3218 MHz, the frequency of the wobble signal becomes 22.05 kHz when it is reproduced at a normal rate. A wobble detection circuit 61 detects this wobble signal. A clock generation circuit 55 generates a write clock CK which is synchronized with the wobble signal by using a VCO or the like means. In a case where address information is included in this wobble signal by means of, e.g., phase modulation, this address information is detected by an address detection circuit 62 and is supplied to the controller 46.

According to this embodiment in which a wobble signal per se is recorded by the CLV system, a clock frequency can be made proportional to a record position in the radial direction automatically and accurately by synchronizing a clock signal with the wobble signal while maintaining the rotation speed of the optical disc constant. In this case also, the frequency can be changed over a broad range by employing the above described method of switching the center frequency of the VCO in accordance with the output of the linear encoder 44.

The invention is applicable not only to recording in the above described magneto-optical disc but also to recording in an optical disc in which recording can be made only once.

In these recording and reproduction devices, the invention is applicable not only to a case where accessing is made over the en tire surface of the optical disc while the optical disc is rotated at a substantially constant number of revolution per unit time but also to a case where the recording area of an optical disc is divided in several areas in the radial direction and accessing is made at a substantially constant rotation speed in one area and at a different rotation speed in another area.

Figure 7:
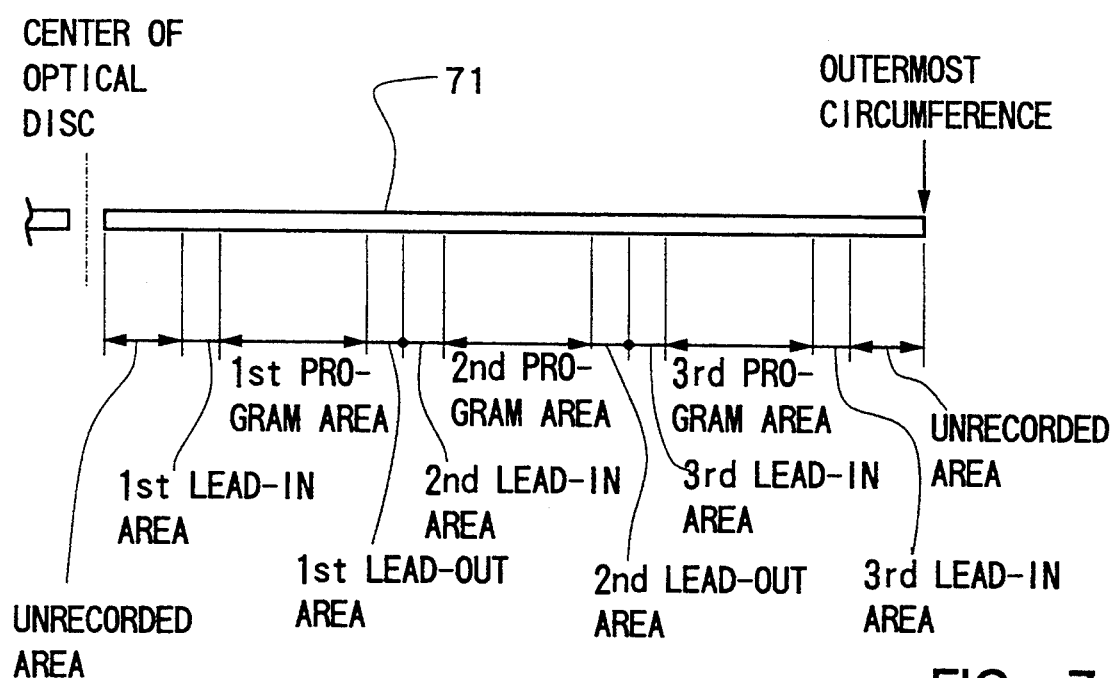
FIG. 7 is a diagram for describing a layout of a record area of the optical disc.
Figure 8:
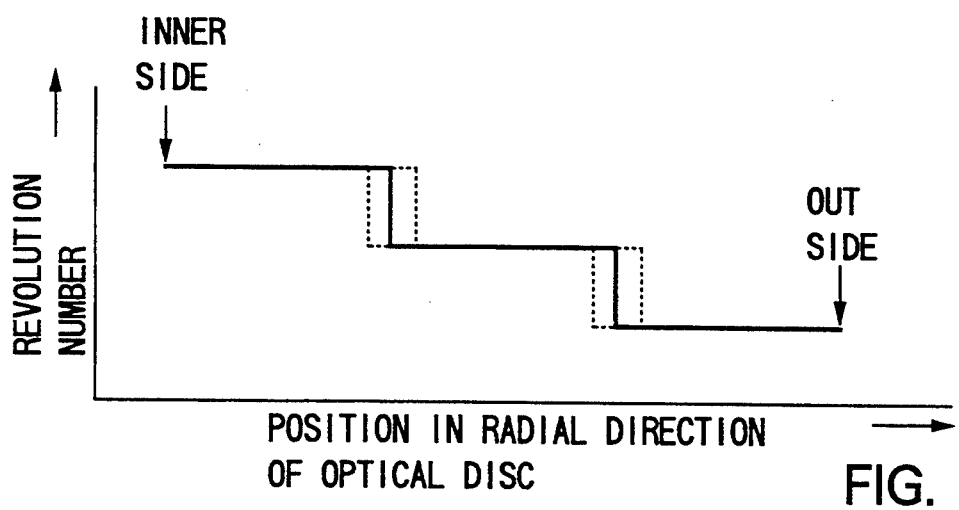
FIG. 8 is a graph showing relationship between the position in the radial direction of the optical disc of FIG. 7 and the number of revolution per unit time.
Figure 9:
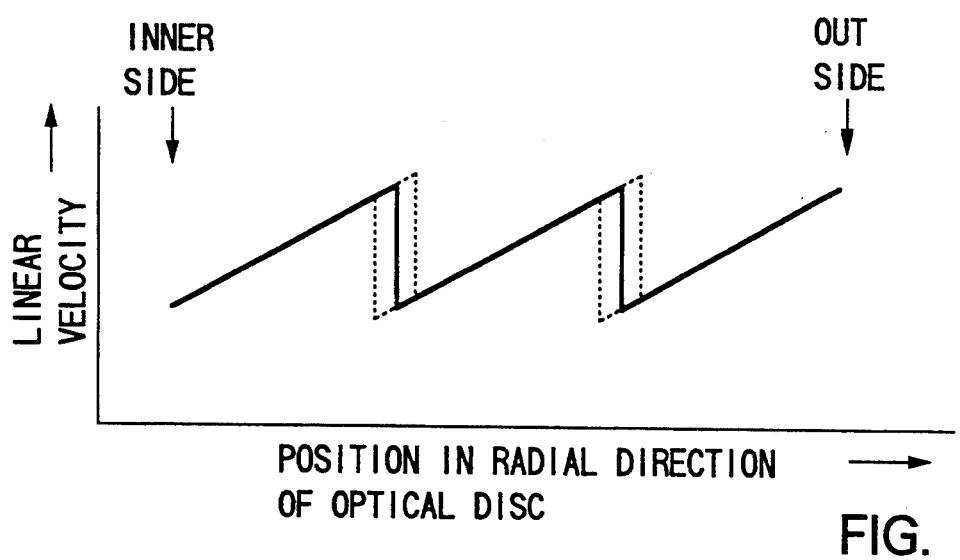
FIG. 9 is a graph showing the position in the radial direction of optical disc of FIG. 7 and the linear velocity.

FIG. 7 is a general layout of an example of memory areas in the radial direction of the optical disc. In this example, three program areas of the first, second and third program areas from the inner side (from left in order as viewed in the figure) are provided in an optical disc 71 and a lead-in area and a lead-out area are provided on the inner side and the outer side of each program area. The rotation control of the disc is made by detecting border positions of the three program areas. As shown by solid line in FIG. 8 for example, the number of revolution of the disc is constant throughout each area and it is smaller in the outer circumference than in the inner circumference. FIG. 9 shows, in solid line, the linear velocity with respect to the record position in these areas.

By this arrangement, increase in the linear velocity in an area in the vicinity of the outer diameter of the optical disc can be prevented.

The border between the respective areas should preferably coincide with a pause of a program or data to be recorded on the optical disc. When one program is performed, for example, a range in which accessing is frequently made is limited. Accordingly, the disc may be rotated at the same revolution number in this limited range. In a case where one disc is divided in several extents and respective extents are treated as if they were different discs, a border may be provided between a lead-out information and lead-in information recorded between respective extents.

Alternatively, respective areas may be provided by equally dividing the entire surface of the optical disc. In this case, the rotation control at the border of the respective areas is preferably provided with a hysteresis characteristic. As shown by dotted lines in FIGS. 8 and 9, when accessing to an adjacent area occurs during accessing to one area, the revolution number is not changed immediately but data is accessed by making the PLL clock reproduction in a predetermined range and the revolution number is changed when deviation from the range continues for a certain period of time. By this arrangement, the number of changes in the revolution number can be reduced and the accessing time can thereby be reduced.

In the above described embodiment, data is recorded at one or more linear velocities on a single optical disc. The invention is not limited to this but is applicable also to a case where a single disc is divided into several regions and there are provided a region where recording is made at a constant linear velocity and a region where recording is made at a constant angular velocity, recording and reproduction being performed at a constant angular velocity as described above.

What is claimed is:

1. A device for accessing an optical disc having plural radial zones, wherein data is recorded onto or reproduced from the disc at least at one constant linear velocity, comprising:
   means for rotating the optical disc at more than one constant rotation velocity corresponding to the number of radial zones;
   a head for accessing the optical disc for recording or reading out the data;
   head moving means for moving the head in the radial direction of the optical disc wherein, when the optical disc is driven by drive means, the head accesses the optical disc at one of the constant rotation velocities;
   means for selecting one of the constant rotation velocities in accordance with the radial zone being accessed by the head; and
   data processing means for changing a clock in accordance with the position of the head in the radial direction of the optical disc, and processing data which is recorded in or reproduced from the optical disc in response to the clock, wherein the data which is accessed from the radial zone on the optical disc by the head at a constant rotation velocity is recorded or reproduced substantially at a constant linear velocity.

2. A device as defined in claim 1 wherein said data processing means increases the frequency of the clock toward the outermost circumference of each radial zone of the optical disc.

3. A device as defined in claim 2 wherein the frequency of the clock for a particular radial zone is proportional to the diameter of the optical disc at a position at which the optical disc is accessed.

4. A device as defined in claim 2 wherein said data processing means comprises clock reproduction means for reproducing the clock.

5. A device as defined in claim 1 wherein the optical disc is one in which data is recorded.

6. A device as defined in claim 5 wherein the optical disc is a CD-ROM.

7. A device as defined in claim 5 wherein the optical disc is a Compact Disc for sequential accessing.

8. A device as defined in claim 1 wherein the optical disc is one in which data can be recorded.

9. A device as defined in claim 8 wherein the optical disc is a Mini Disc.

10. A device as defined in claim 8 wherein the optical disc is one in which a wobble signal is recorded.

11. A device as defined in claim 10 wherein the optical disc is a CD-MO.

12. A method for accessing an optical disc having plural radial zones, wherein data is recorded onto or reproduced from the disc at least at one constant linear velocity, comprising the steps of:
   rotating the optical disc at one of plural constant rotation velocities;
   moving a head for accessing the optical disc for recording or reading out the data in the radial direction of the optical disc in such a manner that, when the optical disc is driven by drive means, the head accesses the optical disc at a constant rotation velocity;
   selecting one of the plural constant rotation velocities in accordance with the radial zone being accessed by the head; and
   changing a clock in accordance with the position of the head in the radial direction of the optical disc and processing data which is recorded in or reproduced from the optical disc in response to the clock, wherein the data which is accessed from within the radial zone on the optical disc by the head at a constant rotation velocity is recorded or reproduced substantially at a constant linear velocity.

13. A device for reproducing an optical disc, the optical disc having data recorded therein in plural radial zones at a constant linear velocity at a substantially constant number of revolutions per unit time comprising:
   selecting means for selecting one of plural constant rotation velocities in accordance with the radial zone being accessed by the head;
   drive means for rotating the optical disc according to the selected velocity;
   data reading means for reading the data recorded in the optical disc to produce a read signal;
   clock reproduction means for reproducing a clock signal from the read signal provided by said reading means;
   demodulation means for demodulating the read signal in accordance with the clock signal reproduced by the clock reproduction means;
   a memory for successively storing the demodulated signal obtained by the demodulating means; and
   reproduction processing means for reading out the demodulated signal stored in the memory at a predetermined time and subjecting it to reproduction processing.

14. A method for reproducing an optical disc, the optical disc having data recorded therein in plural radial zones at a constant linear velocity at a substantially constant number of revolutions per unit time, the method comprising the steps of:
   selecting one of plural constant rotation velocities in accordance with the radial zone being accessed by the head;
   rotating the optical disc at the selected velocity;
   reading the data recorded in the optical disc to produce a read signal;
   reproducing a clock signal from the read signal;
   demodulating the read signal in accordance with the reproduced clock signal;
   storing the demodulated signal successively in a memory; and
   reading out the demodulated signal stored in the memory at a predetermined time and subjecting it to reproduction processing.

15. A device for recording data in the optical disc in which data is to be recorded in plural radial zones at a constant linear velocity at a substantially constant number of revolutions per unit time, the device comprising:
   means for designating plural radial zones on the disc;

rotating means for rotating the disc at one of plural constant rotation velocities corresponding to the designated radial zone;

data writing means for writing a signal to be recorded in the optical disc;

memory means for storing data to be recorded;

clock generation means for generating a clock signal which successively changes in its frequency in accordance with the designated radial zone and a position of the write head in the radial direction in the radial zone of the optical disc; and modulation means for modulating the data read from the memory as a signal to be recorded in accordance with the clock signal and providing it to the record head.

16. A device as defined in claim 15 wherein a wobble signal is recorded in the optical disc.

17. A method for recording data in the optical disc in which data is to be recorded at a constant linear velocity at a substantially constant number of revolutions per unit time, the method comprising the steps of:

designating plural radial zones on the disc;

selecting one of plural constant rotation velocities in accordance with the designated radial zone;

rotating the optical disc according to the selected velocity;

writing a signal to be recorded in the optical disc;

storing data to be recorded in a memory;

generating a clock signal which successively changes in its frequency in accordance with the designated radial zone and the position of the write head in the radial direction of the optical disc; and modulating the data read from the memory as a signal to be recorded in accordance with the clock signal and providing it to the record head.

* * * * *